United States Patent
Hansen et al.

(10) Patent No.: US 7,876,106 B2
(45) Date of Patent: Jan. 25, 2011

(54) SYSTEM AND METHOD FOR DETECTING AN OBJECT AT A LOCATION

(75) Inventors: Mark C. Hansen, Kokomo, IN (US); Dennis P. Griffin, Noblesville, IN (US); Kevin D. Kincaid, Kokomo, IN (US); Mohamed R. Jaraki, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 451 days.

(21) Appl. No.: 12/150,439

(22) Filed: Apr. 28, 2008

(65) Prior Publication Data

US 2009/0267622 A1  Oct. 29, 2009

(51) Int. Cl.
G01R 27/26 (2006.01)
B60R 21/16 (2006.01)
G08B 21/00 (2006.01)

(52) U.S. Cl. .................. 324/681; 280/735; 340/667

(58) Field of Classification Search .......... 324/681, 324/658, 649, 600, 635, 644, 662, 671, 699, 324/716, 674; 340/540, 541, 561, 562, 665, 340/666, 667, 438; 280/734, 735; 701/45, 701/47, 49
See application file for complete search history.

(56) References Cited

U.S. PATENT DOCUMENTS

| | | | |
|---|---|---|---|
| 5,914,610 A | 6/1999 | Gershenfeld et al. | |
| 6,161,070 A | 12/2000 | Jinno et al. | |
| 6,179,378 B1 | 1/2001 | Baumgartner et al. | |
| 6,556,137 B1 | 4/2003 | Oka et al. | |
| 6,559,555 B1 | 5/2003 | Saitou et al. | |
| 6,644,689 B2 | 11/2003 | Murphy | |
| 6,696,948 B2 | 2/2004 | Thompson et al. | |
| 6,816,077 B1 | 11/2004 | Shieh et al. | |
| 6,877,606 B2 | 4/2005 | Hardy | |
| 6,960,841 B2 | 11/2005 | Saitou et al. | |
| 7,048,338 B2 | 5/2006 | Pinkos | |
| 7,084,763 B2 | 8/2006 | Shieh et al. | |
| 7,102,527 B2 | 9/2006 | Shieh et al. | |
| 7,151,452 B2 | 12/2006 | Shieh | |
| 7,194,346 B2 | 3/2007 | Griffin et al. | |
| 7,205,777 B2 * | 4/2007 | Schulz et al. | 324/661 |
| 7,432,718 B2 * | 10/2008 | Ishihara et al. | 324/457 |
| 2004/0111201 A1 | 6/2004 | Thompson et al. | |
| 2005/0253712 A1 | 11/2005 | Kimura et al. | |
| 2006/0187038 A1 | 8/2006 | Shieh et al. | |
| 2007/0029768 A1 * | 2/2007 | Clos et al. | 280/735 |
| 2010/0188242 A1 * | 7/2010 | Petereit et al. | 340/667 |

FOREIGN PATENT DOCUMENTS

WO  WO9513204  5/1995

* cited by examiner

*Primary Examiner*—Hoai-An D Nguyen
(74) *Attorney, Agent, or Firm*—Thomas N. Twomey

(57) ABSTRACT

An occupancy detection system includes a signal generator coupled to an electrode, the signal generator configured to output a first signal at a first frequency and a second signal at a second frequency. The system further includes a voltage detection circuit connected to an output terminal of the signal generator and to an input terminal of the electrode, wherein the voltage detection circuit is configured to measure a first voltage responsive to the first signal at the first frequency and a second voltage responsive to the second signal at the second frequency. A control module in communication with the voltage detection circuit is configured to detect a state of occupancy based on the first voltage and the second voltage.

20 Claims, 2 Drawing Sheets

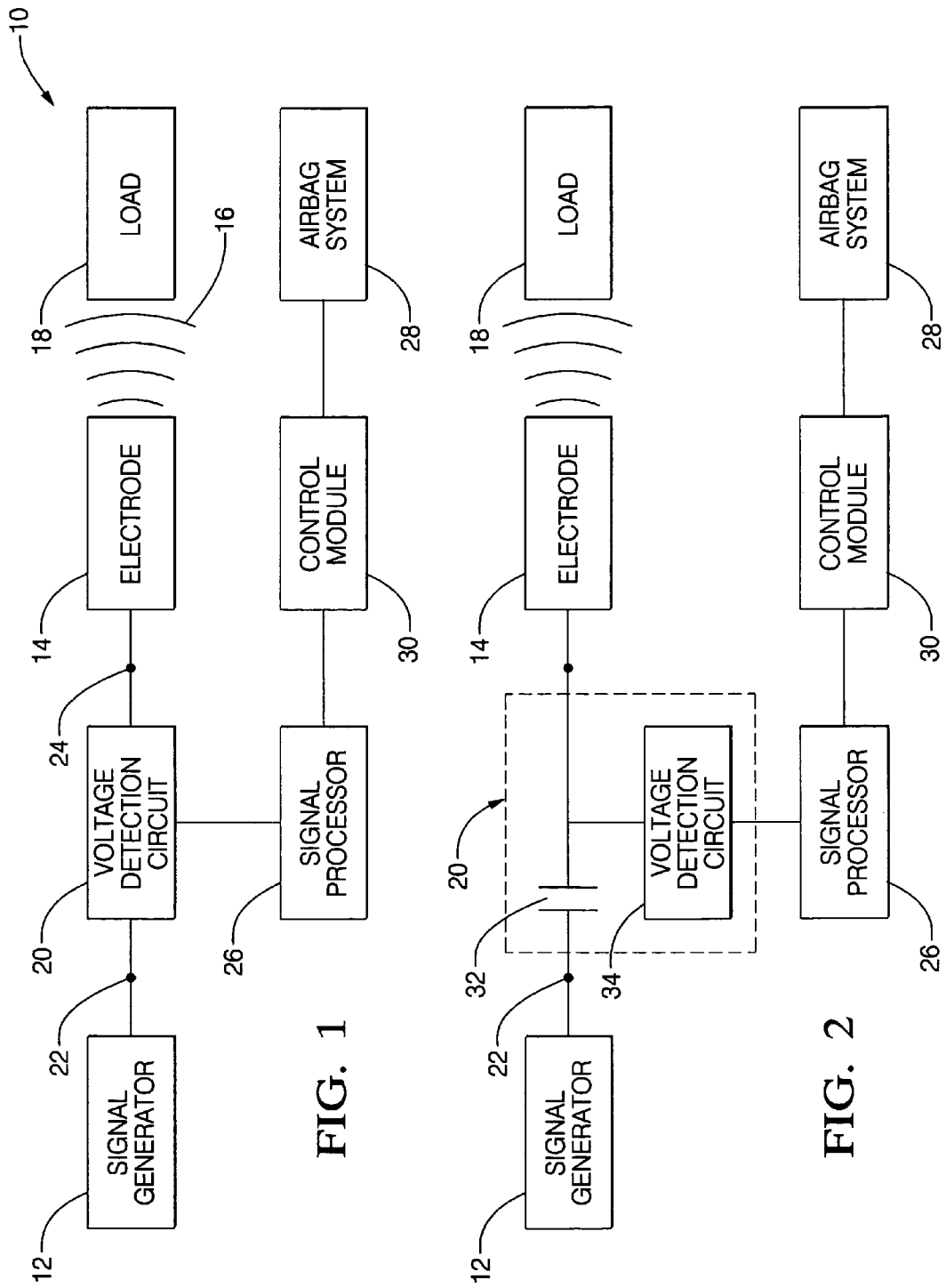

SYSTEM AND METHOD FOR DETECTING AN OBJECT AT A LOCATION

BACKGROUND

Many industries may benefit from occupant detection systems and methods. One such industry is the transportation industry. For instance, several automotive applications are dependent upon an occupant or passenger being present in a vehicle. In one example, many airbag systems are only enabled when the passenger is in the seat. Generally, each airbag in the airbag system is associated with a specific passenger and seat. If a passenger is present in the seat, the airbag may be enabled. If no passenger is present in the seat, then the airbag remains disabled. However, studies have shown that normal airbag deployment may not be ideal, but deploying an airbag with reduced force or disabling airbag deployment under certain circumstances may be appropriate, especially when a small child or car seat is detected. Therefore, there are several instances where deploying an airbag is not ideal even though a passenger is detected. Accordingly, the airbag control system must be able to determine whether the passenger is an older child or an adult before enabling the airbag system. Other occupant detection systems used in other industries may need to make similar determinations.

Returning to the automotive example, previous airbag enabling systems have used proximity sensors to detect whether the person is present and enable the airbag system. The proximity sensors are able to detect the presence of nearby objects remotely by relying on the passenger to alter the effective dielectric between two plates of a capacitor. These proximity sensors may also determine the size of the passenger based on the capacitance. However, environmental conditions may interfere with the readings of the proximity sensor, resulting in false outputs. These false outputs may enable the airbag or other systems in an undesirable situation, such as when a small child or child seat is present. Specifically, environmental conditions may trick the sensor into determining that the passenger is larger than they actually are, or that enabling the airbag is otherwise appropriate. For instance, at least one of the environmental conditions may cause the sensor to detect a non-living object as a person. This could result in the sensor detecting shopping bags resting on a seat as a person and enable the airbag for that seat. Some environmental conditions that may cause false outputs include the humidity or other moisture inside the vehicle and the characteristics of the seat. Humidity affects the permittivity of the air, thus changing the flow of a charge between the person or object and the sensor. As seats age and foam in the seat compresses, the distance between the sensor electrode and the person may change, thus changing the capacitive coupling between the person or object and the sensor. There are other environmental conditions that may cause false outputs as well. In order to compensate for these and other environmental conditions, previous occupant detection systems employed multiple sensors, each detecting only one environmental condition.

Accordingly, an occupant detection system is needed that is able to detect occupants independent of the environmental conditions. Although the examples above were directed to airbag deployment in the automotive industry, the system may be useful in other automotive or non-automotive applications.

BRIEF SUMMARY

An occupancy detection system includes a signal generator coupled to an electrode, the signal generator configured to output a first signal at a first frequency and a second signal at a second frequency. The system further includes a voltage detection circuit connected to an output terminal of the signal generator and to an input terminal of the electrode, wherein the voltage detection circuit is configured to measure a first voltage responsive to the first signal at the first frequency and a second voltage responsive to the second signal at the second frequency. A control module in communication with the voltage detection circuit is configured to detect a state of occupancy based on the first voltage and the second voltage.

A method of detecting an object at a location includes applying a first signal at a first frequency to an input terminal of an electrode and measuring a first voltage at the input terminal of the electrode wherein the first voltage is responsive to the first signal at the first frequency. The method also includes applying a second signal at a second frequency to the input terminal of the electrode and measuring a second voltage at the input terminal of the electrode, wherein the second voltage is responsive to the second signal at the second frequency. The first voltage is compared to the second voltage to determine a state of occupancy at the location.

BRIEF DESCRIPTION OF THE DRAWINGS

FIG. 1 is a schematic diagram of an exemplary detection system, according to an embodiment;

FIG. 2 is a schematic diagram of another exemplary detection system, according to an embodiment.

DETAILED DESCRIPTION

Figure 3:
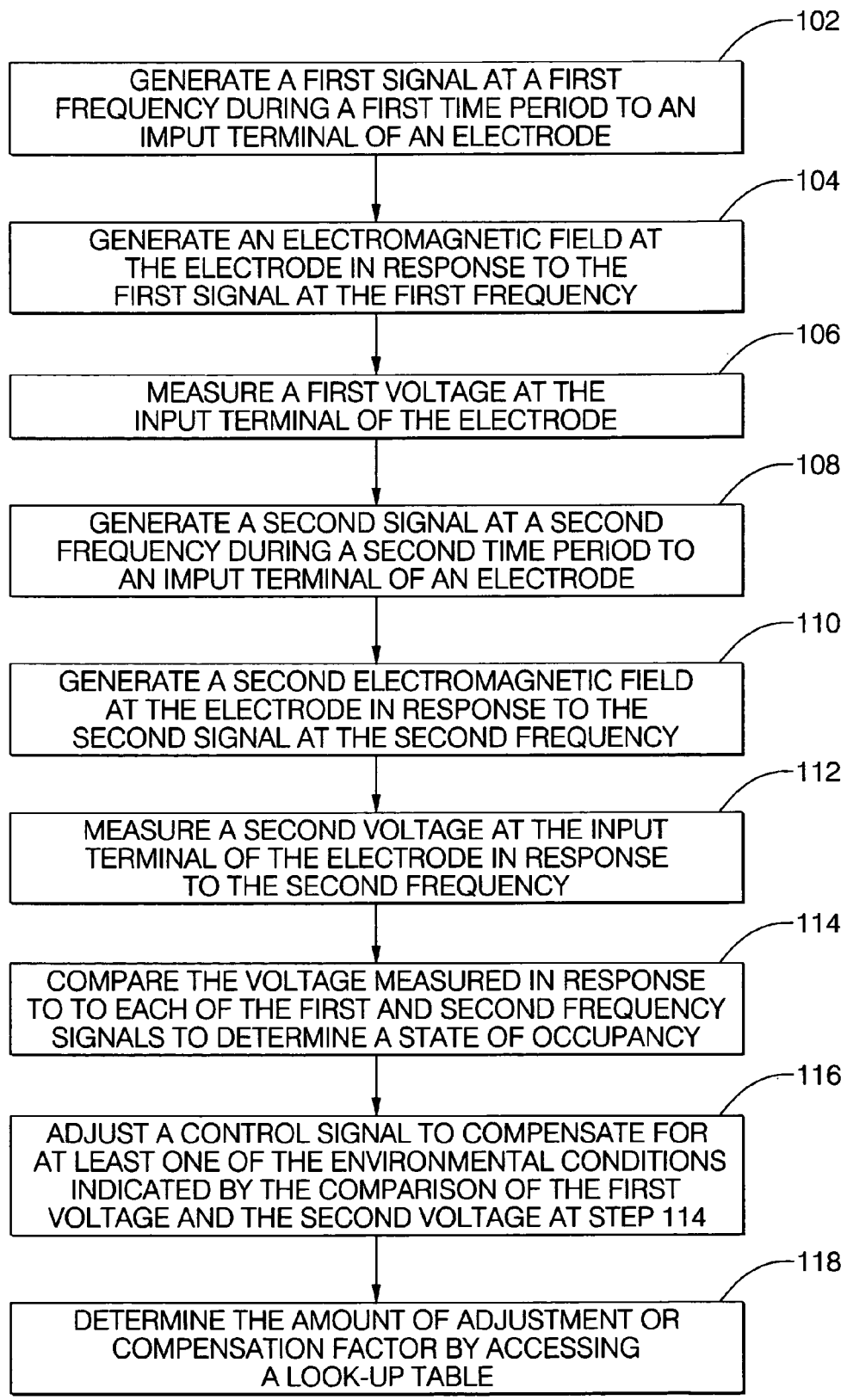
FIG. 3 is a flowchart of an exemplary method for detecting the state of occupancy at a location.

A system and method are provided for detecting the presence of an object at a location, independent from environmental conditions that may impact the accuracy or effectiveness of the detection system (e.g., ambient humidity or moisture levels due to liquid). The system generally includes a signal generator in communication with an electrode, wherein the signal generator is configured to output a plurality of signals at varying frequency levels to generate an electromagnetic field from the electrode. The electromagnetic field is projected to a location, such as a vehicle seat, to detect the presence of an object (often referred to as a load). The impedance presented by the load, which may vary due to the size, shape and physical characteristics of the object, affect the magnitude of the electromagnetic field emanating from the electrode. This change in impedance can be quantified or measured with a voltage detector circuit disposed between an output terminal of the signal generator and an input terminal of the electrode. In other words, the change in impedance of the load is measured by the voltage detector circuit at a plurality of frequency levels to determine the presence of an object and/or the presence of an environmental condition that may affect the impedance of the load. This determination is based on the characteristics of the impedance of the load when an environmental condition is present. More specifically, the impedance of a load will be substantially the same, or calibrated to be substantially the same, when no environmental condition that will affect the impedance of the load is present, regardless of the signal frequency. That is, certain environmental conditions will affect the determination of a state of occupancy, while others will not. For example, when no environmental condition that will affect the impedance of the load is present, the impedance of the load at the electrode (represented by the voltage measured at the input terminal of the electrode), will be the same for low frequencies as for high frequencies. However, when an environmental condition is present, a change in the impedance of the load occurs at lower frequency levels that affect the electromagnetic field, which in turn, is characterized by a change in voltage at the input terminal of the electrode.

In one embodiment in which this detection system is applied to a vehicle airbag control system, the system may also include a control module configured to receive the measured voltages from the voltage detector circuit to determine whether a change in impedance of the load is due to the presence of an environmental condition. The control module is further configured to compensate for the environmental condition such that a determination to enable or disable the airbag system is made independently from the presence of an environmental condition. In this way, the affects of an environmental condition on the impedance of a load are eliminated.

FIG. 1 schematically represents an exemplary detection system 10 according to an embodiment. The system 10 includes a signal generator 12 configured to output a first signal at a first frequency during a first time period and a second signal at a second frequency during a second time period. In one exemplary approach, the first frequency may be different from the second frequency. Specifically, the first frequency may be characterized as a high frequency and the second frequency may be characterized as a low frequency, or vice-versa. In addition, up to n frequencies at n additional time periods may be implemented, depending upon the criteria and capacity of the system. The first and second signals may be output simultaneously or sequentially by the signal generator 12. The first signal and the second signal may be output for different durations of time. If output simultaneously, multiple signal generators may be used. The output magnitude of the signal generator will generally be constant, however, one of ordinary skill in the art understands that various signal processing applications can be applied to equalize and calibrate the signals.

The signal generator 12 is in communication with an electrode 14, which is configured to generate an electromagnetic field 16 in response to the signals from signal generator 12. The electromagnetic field is projected to a location at which an object is to be detected. The presence of an object alters the magnitude of the electromagnetic field due to an impedance presented by the object. Environmental conditions, such as, but not limited to, humidity and moisture (e.g. a spill), can also affect the magnitude of the electromagnetic field by changing the impedance seen by the electrode. The collective impact of the impedance of the object and any environmental condition is often referred to as the impedance of the load 18.

In one embodiment, the impedance of a load 18 is quantified using a voltage detection circuit 20 that is connected between an output terminal 22 of the signal generator 12 and an input terminal 24 of the electrode 14. Voltages are measured at output terminal 24 for each of n frequencies at n time periods. In one exemplary approach, there are at least two voltages measured at output terminal 24, one at a first frequency and one at a second frequency. Generally, at least one of the frequencies will be considered a high frequency and one will be considered a low frequency.

The system 10 may further include a signal processor 26 in communication with the voltage detection circuit 20. The signal processor 26 includes a plurality of noise filters and is configured to convert the measured voltages into digital amplitudes. The amplitudes are then compared to determine if a change in voltage has occurred between the voltage measured at the first frequency and the voltage measured at the second frequency. A change or difference in voltages indicates the presence of an environmental condition that will affect the impedance of the load.

In one exemplary approach, the detection system 10 may be used to enable, disable or change the response of a vehicle airbag system 28. In many vehicle airbag systems 28 airbag deployment is only enabled when a person or object of specific size or shape are in a seat of the vehicle. For example, it may be beneficial to only enable the vehicle airbag system 28 when an older child or adult is present in the seat. The size of a person may be proportional (generally inversely proportional) to that person's impedance (i.e., impedance of the load) and will affect the voltage at the input terminal 24 of the electrode 14. However, environmental conditions may also increase the loading on the system 10 causing the perceived occupant load to appear greater than it is, indicating to the detection system 10 that the size of the person seems different than they actually are. In this context, environmental conditions may include humidity, moisture in the vehicle, temperature, spills and characteristics of the seat such as age. In this and other contexts, other environmental conditions may affect the impedance. This change or increase in impedance indicated by the electrode 14 may result in the airbag system 28 being enabled when no person is present, or when a child or child seat is present since an increase in the impedance of the load 18 indicates that a larger person may be present in the vehicle. To accurately enable the airbag system 28, the system 10 may compensate for these environmental conditions when present.

To accurately compensate for effects of an environmental condition, the measured voltages may first be processed by the signal processor 26, which may include a noise filter to remove electrical noise found in the environment. This noise filter could be realized in hardware or software. In one exemplary approach, the signal processor 26 first includes a sub-sampling circuit that converts the incoming analog frequency waveforms from their given frequency down to a much lower frequency. This is a simple, low-cost approach to determine the amplitude of an incoming waveform by use of a low-cost microprocessor operating an analog-to-digital converter at a slower sampling frequency. Thus, the signal processor 26 can convert the analog frequency waveform voltages into digital amplitudes. In this exemplary approach, a low-pass filter then filters the incoming amplitudes to remove any higher-frequency noise found in the amplitudes. The resultant output of signal processor 26 is n ($n \geq 2$) different amplitudes that represent the frequency information of the system 10 after n time periods.

Signal processor 26 may further include a calibration adjustment process whereby the measured frequency amplitudes are always modified by a specified amount dependant upon the represented frequency. This specified amount may be determined in the original manufacturing environment. The purpose of the calibration adjustment is to ensure that at a given environmental condition, all frequency amplitudes have a known relationship. In one exemplary approach, the amplitudes of all incoming frequency waveforms are made equal when the environmental conditions are at a known level.

To compensate for the environmental conditions, the system 10 may include a control module 30 in communication with the signal processor 26. The control module 30 may be a circuit (i.e., hardware) or, alternatively, may be software operating on a computer. The control module 30 may be configured to store the first frequency amplitude and the second frequency amplitude at the first and second time periods, respectively. Additionally, n−2 frequency amplitudes may be stored from n−2 time periods. By analyzing the differences in the amplitudes during the first and second time periods, and the second voltage during the first and second time periods (or n time periods), the control module 30 may determine the adjustment needed to compensate for the affects of when analyzing the impedance of the load 18. Removing the affects of the impedance caused by the environmental conditions results in the object portion of the load 18 being indicated independent of the environmental conditions. In the context of enabling the airbag system 28, the output of control module 30 may provide input to the airbag system 28 independent of the environmental conditions. By compensating for the environmental conditions, the system 10 may reduce the chance of prematurely enabling the airbag system 28.

FIG. 2 illustrates another embodiment of detection system 10 wherein the voltage detection circuit 20 includes a capacitor 32 and a voltage detector 34 that provides a means for measuring the voltage at output terminal 24. One of ordinary skill in the art understands that voltage detection circuit 20 may include any combination of electrical components that create a reference impedance network, including purely resistive or partially reactive components.

FIG. 3 illustrates a flow chart of an exemplary method 100 for detecting an object, independent of environmental conditions. The method 100 includes generating at step 102 a first signal at a first frequency during a first time period to an input terminal 24 of an electrode 14. An electromagnetic field is generated by the electrode 14 at step 104 in response to the first signal at the first frequency. At step 106, a first voltage is measured at the input terminal 24 of the electrode 14. At step 108, a second signal at a second frequency is generated and output to the input terminal 24 of the electrode 14, wherein a second electromagnetic field is generated at step 110 in response to the second signal at the second frequency. The voltage at input terminal 24 is measured at step 112 in response to the second frequency signal. At step 114, the voltages measured in response to each of the first and second frequency signals is compared to determine a state of occupancy. The state of occupancy may include, but is not limited to, the presence of an object and/or the presence of an environmental condition such as humidity or moisture. As previously discussed, a difference between the first voltage at the first frequency and the second voltage at the second frequency is indicative of at least one environmental condition.

In one exemplary approach, the method 100 may further include a step 116 of adjusting a control signal to compensate for at least one of the environmental conditions indicated by the comparison of the first voltage and the second voltages at step 114. The method 100 may further include a step 118 of determining the amount of adjustment or compensation factor by accessing a look-up table.

The above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What we claim is:

1. An occupancy detection system, comprising:
   a signal generator coupled to an electrode, the signal generator configured to output a first signal at a first frequency and a second signal at a second frequency;
   a voltage detection circuit connected to an output terminal of the signal generator and to an input terminal of the electrode, the voltage detection circuit configured to measure a first voltage responsive to the first signal at the first frequency and a second voltage responsive to the second signal at the second frequency; and
   a control module in communication with the voltage detection circuit, the control module being configured to detect a state of occupancy based on the first voltage and the second voltage.

2. The detection system of claim 1, wherein the state of occupancy includes an environmental condition.

3. The detection system of claim 1, wherein the state of occupancy includes the presence of an object at a location.

4. The detection system of claim 1, wherein the voltage detection circuit includes a capacitor having a first terminal connected to the output terminal of the signal generator and a second terminal connected to the input terminal of the electrode.

5. The detection system of claim 4, wherein the voltage detection circuit further includes a means for measuring the first and second voltages at the second terminal of the capacitor.

6. The detection system of claim 5, wherein the control module is configured to determine a compensation factor based on a comparison of the first and second voltages.

7. The detection system of claim 5, wherein a difference between the first and second voltages at the second terminal of the capacitor indicates an environmental condition.

8. The detection system of claim 7, wherein the environmental condition is humidity.

9. The detection system of claim 1, wherein one or both of the first and second voltages is responsive to an impedance of a load.

10. The detection system of claim 4, further including an airbag system in communication with the control module.

11. The detection system of claim 10, wherein the control module is configured to compensate for the presence of an environmental condition independently from the presence of an object at a location.

12. The detection system of claim 1, wherein the voltage detection circuit includes a resistor connected to a means for measuring voltage at the input terminal of the electrode.

13. The detection system of claim 1, wherein the first frequency is distinct from the second frequency.

14. A method of detecting an object at a location, said method comprising the steps of:

applying a first signal at a first frequency to an input terminal of an electrode;

measuring a first voltage at the input terminal of the electrode, said first voltage being responsive to the first signal at the first frequency;

applying a second signal at a second frequency to the input terminal of the electrode;

measuring a second voltage at the input terminal of the electrode, said second voltage being responsive to the second signal at the second frequency;

comparing the first voltage to the second voltage to determine a state of occupancy at the location.

15. The method of claim 14, further including converting the first and second voltages to digital amplitudes.

16. The method of claim 15, further including determining the presence of an environmental condition based on a comparison of the digital amplitudes for the first and second voltages.

17. The method of claim 14, further including generating a control signal to an airbag control system based on the state of occupancy.

18. The method of claim 17, further including applying a compensation factor to the control signal to compensate for the presence of an environmental condition.

19. The method of claim 17, further including adjusting the control signal to compensate for an environmental condition if there is a difference between the first voltage and the second voltage.

20. The method of claim 18, further including determining the compensation factor based on a look-up table.

* * * * *